US011560840B2

(12) United States Patent
Schelfaut et al.

(10) Patent No.: US 11,560,840 B2
(45) Date of Patent: Jan. 24, 2023

(54) DAMPER ENGINE MOUNT LINKS

(71) Applicant: General Electric Company, Schenectady, NY (US)

(72) Inventors: Timothy Leo Schelfaut, Lebanon, OH (US); Anthony M. Metz, Harrison, OH (US); Michael A. Riehle, West Chester, OH (US); Jonathan E. Coleman, Mason, OH (US); Illya Emmanuel Arcos Perez, Mason, OH (US); Brian Michael Dixon, West Chester, OH (US)

(73) Assignee: General Electric Company, Schenectady, NY (US)

( * ) Notice: Subject to any disclaimer, the term of this patent is extended or adjusted under 35 U.S.C. 154(b) by 85 days.

(21) Appl. No.: 17/072,710

(22) Filed: Oct. 16, 2020

(65) Prior Publication Data

US 2022/0120218 A1   Apr. 21, 2022

(51) Int. Cl.
| | | |
|---|---|---|
| *F02C 7/00* | (2006.01) | |
| *F16F 15/023* | (2006.01) | |
| *F16F 15/027* | (2006.01) | |
| *F16F 15/06* | (2006.01) | |

(52) U.S. Cl.
CPC .......... *F02C 7/00* (2013.01); *F05D 2220/323* (2013.01); *F05D 2260/96* (2013.01); *F16F 15/023* (2013.01); *F16F 15/0237* (2013.01); *F16F 15/0275* (2013.01); *F16F 15/06* (2013.01); *F16F 2222/12* (2013.01); *F16F 2228/066* (2013.01); *F16F 2230/18* (2013.01)

(58) Field of Classification Search
CPC ........ F02C 7/00; F02C 7/20; F05D 2200/323; F05D 2260/96; F05D 2240/90; F16F 15/023; F16F 15/0237; F16F 15/0275; F16F 15/06; F16F 2222/12; F16F 2228/066; F16F 2230/18; F01D 25/28
USPC ......................................................... 415/119
See application file for complete search history.

(56) References Cited

U.S. PATENT DOCUMENTS

| | | | |
|---|---|---|---|
| 6,189,830 B1 * | 2/2001 | Schnelz ................. | B64D 27/18 244/54 |
| 8,757,579 B2 | 6/2014 | Bonnet et al. | |
| 9,394,057 B2 | 7/2016 | Guillou | |
| 9,919,804 B2 | 3/2018 | Pautis et al. | |
| 10,464,683 B2 | 11/2019 | Pautis et al. | |
| 10,464,685 B2 | 11/2019 | Whiteford et al. | |
| 10,711,861 B1 * | 7/2020 | Kasprzak ............... | F16F 9/063 |
| 2008/0217468 A1 | 9/2008 | Fol | |
| 2018/0118355 A1 * | 5/2018 | Pautis .................... | B64D 27/26 |
| 2019/0061965 A1 | 2/2019 | Gould et al. | |
| 2019/0152616 A1 | 5/2019 | Pautis et al. | |
| 2021/0070459 A1 * | 3/2021 | West ...................... | B64D 27/18 |

* cited by examiner

*Primary Examiner* — Yi-Kai Wang
(74) *Attorney, Agent, or Firm* — Hanley, Flight & Zimmerman, LLC

(57) ABSTRACT

Damper engine mount links are disclosed. An example engine assembly includes a core including a fore portion and an aft portion, the fore portion of the core to couple to a fan hub frame, the aft portion of the core to couple to a turbine rear frame or a turbine center frame. The engine assembly further includes a forward mount to couple the fan hub frame to an aircraft, and a damper link to couple the turbine rear frame or the turbine center frame to an aircraft mount.

22 Claims, 14 Drawing Sheets

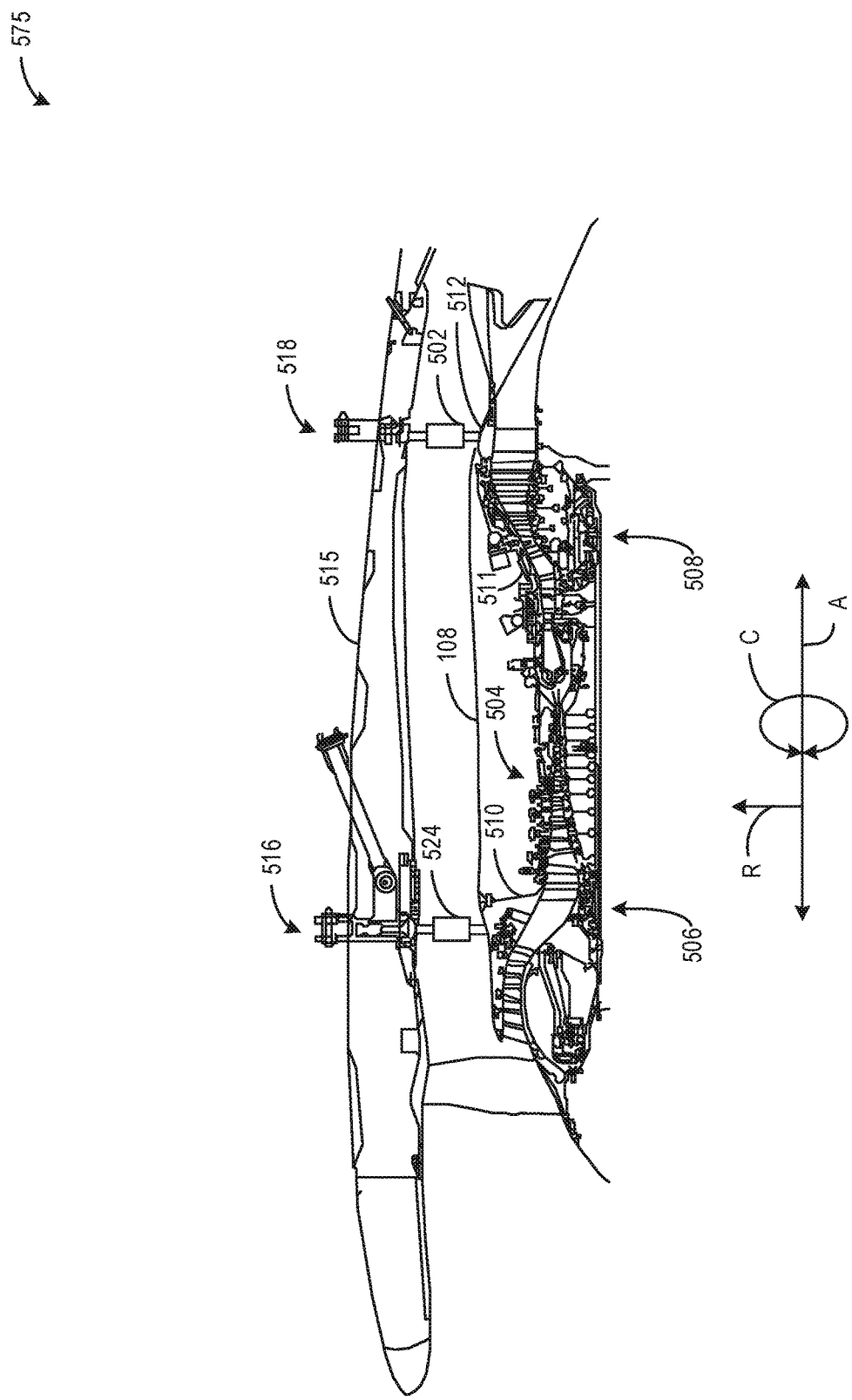

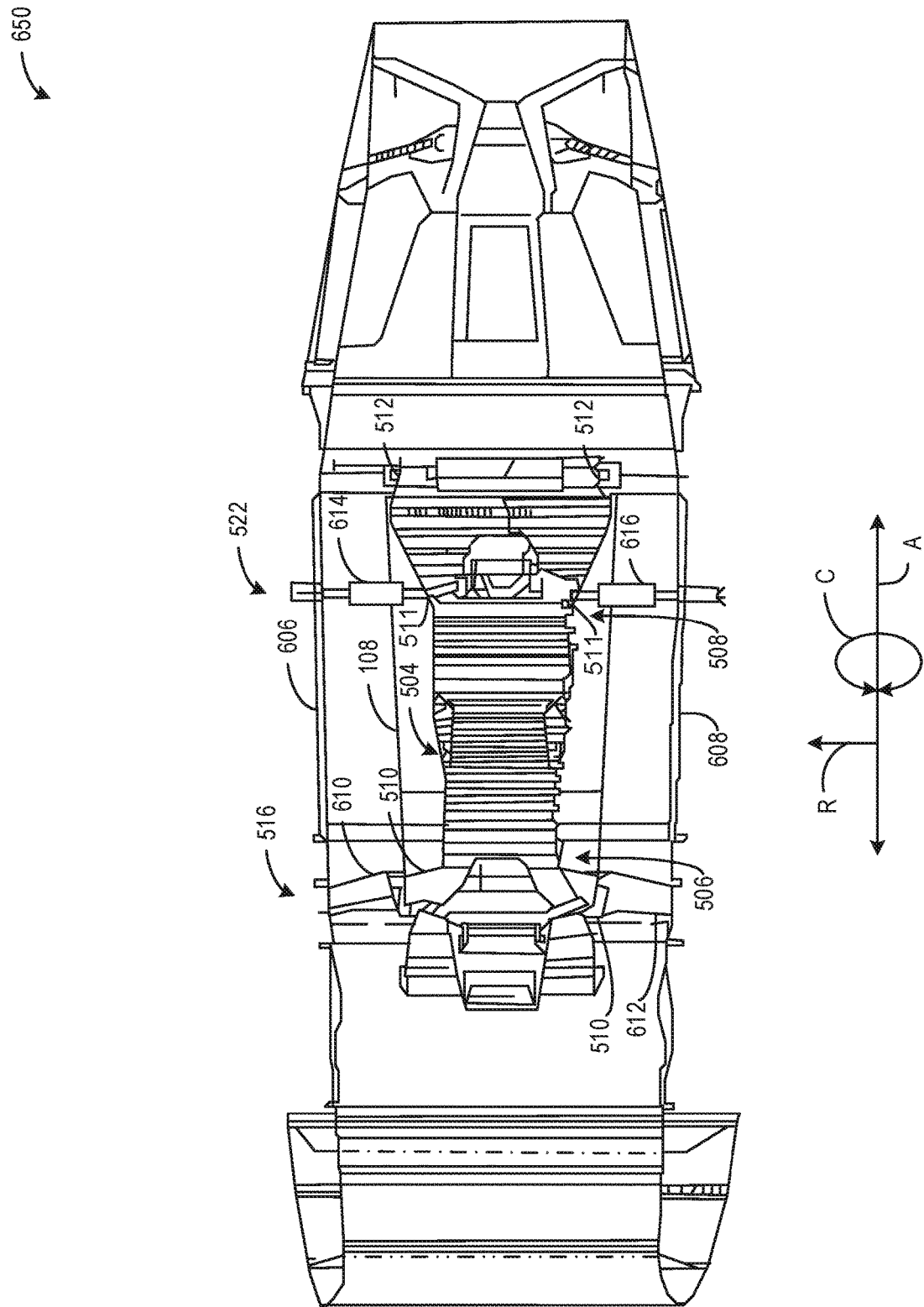

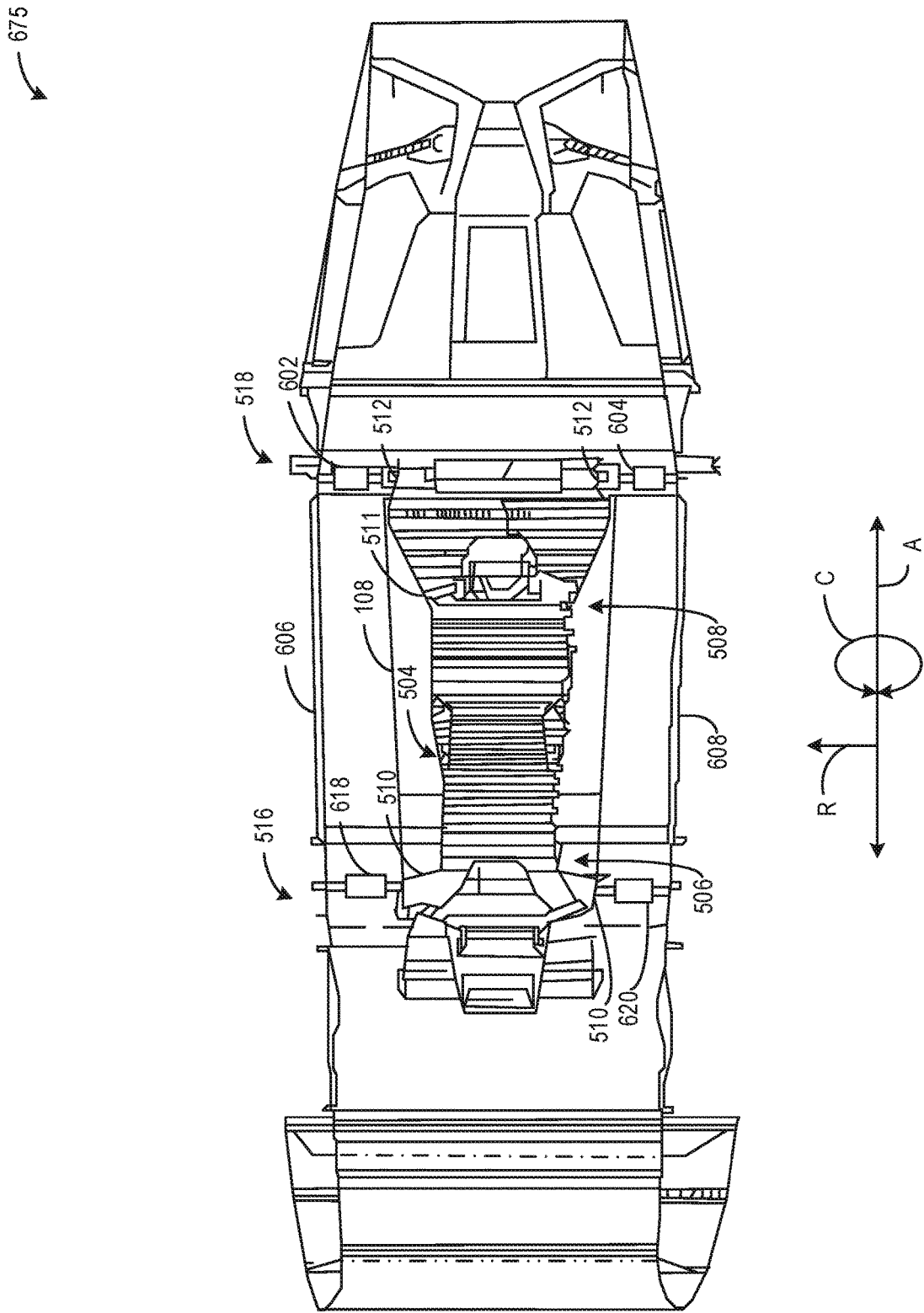

B-B

DAMPER ENGINE MOUNT LINKS

FIELD OF THE DISCLOSURE

This disclosure relates generally to an aircraft engine, and, more particularly, to damper engine mount links.

BACKGROUND

Engines of aircraft typically include a mount(s) to couple the engine to a structure of the aircraft, such as a pylon. The mount(s) provide a linkage system between the engine and the pylon at a leading portion of the engine (e.g., a forward mount) and/or a trailing portion of the engine (e.g., an aft mount). The linkage system maintains a position of the engine relative to the aircraft. The linkage system can impact loads encountered by the engine, the alignment of rotor to stator flowpath steps throughout the engine, and tip clearances between the blades and a casing of the engine.

BRIEF DESCRIPTION OF THE DRAWINGS

FIGS. 5A-C illustrate an example damper link mount implemented in an example aircraft engine.

FIGS. 6A-C illustrate a plurality of damper link mounts implemented in the example aircraft engine of FIGS. 5A-C.

Figure 1:
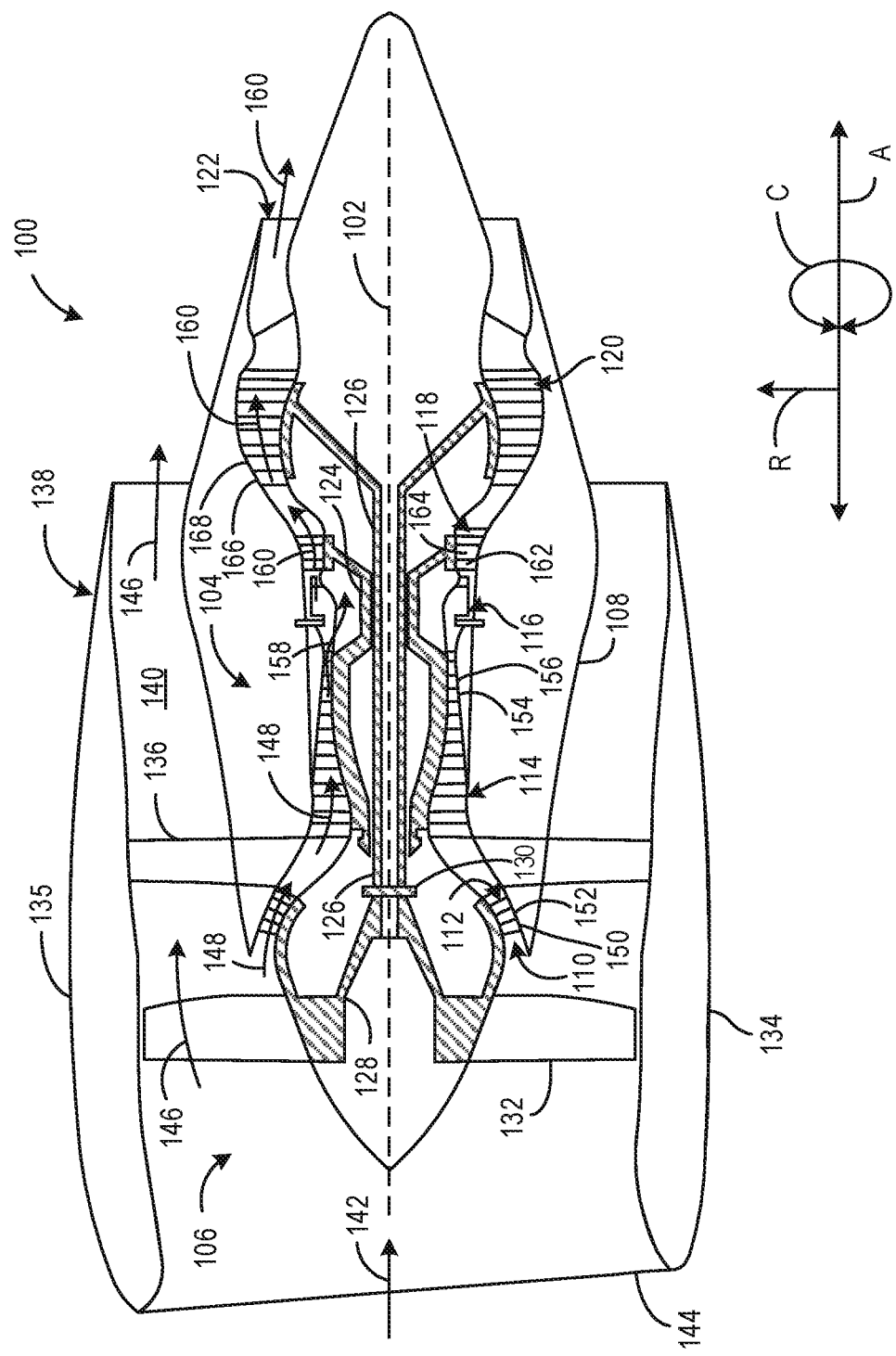
FIG. 1 illustrates a schematic cross-sectional view of a prior art example of an aircraft engine.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time +/−1 second.

BRIEF SUMMARY

Damper engine mount links are disclosed.

Certain examples herein provide an engine assembly. The engine assembly includes a core including a fore portion and an aft portion, the fore portion of the core to couple to a fan hub frame, the aft portion of the core to couple to a turbine rear frame or a turbine center frame. The engine assembly further includes a forward mount to couple the fan hub frame to a first aircraft mount, and at least one damper link configured to couple the turbine rear frame or the turbine center frame to a second aircraft mount.

Certain examples herein provide an apparatus including a damper link that includes a stiffness corresponding to at least one of a position of the damper link or a length of the damper link, or a rate of change of the length of the damper link, The apparatus further includes an engine to couple to a first longitudinal end of the damper link, and a nacelle or a pylon in connection with a wing of an aircraft, the nacelle or the pylon to couple to a second longitudinal end of the damper link.

Certain examples herein provide an apparatus including first means for mounting a fore portion of an engine to an aircraft, second means for mounting an aft portion of the engine to the aircraft, the second means for mounting including a first means for damping to support the engine in response to a movement of the engine.

DETAILED DESCRIPTION

Damper engine mount links are disclosed herein. In general, engine mounts can be used to attach an engine of an aircraft to a structure, such as a pylon or a nacelle. In some examples, a forward mount is implemented to couple a leading portion of the engine and/or a fan hub frame to the aircraft. In some examples, the leading portion of the engine is coupled to the fan hub frame. In some examples, a casing that surrounds the engine is also coupled to the fan hub frame. In some examples, an aft mount is implemented in addition to the forward mount to couple a trailing portion of the engine, such as a portion coupled to a turbine rear frame or a turbine center frame, to the aircraft. The forward mount and the aft mount provide a rigid and/or fixed connection between the engine and the pylon or nacelle. In general, the forward mount and/or the aft mount maintain a relative position of the engine during operations of the aircraft.

In some implementations, a cantilevered engine includes the forward mount and no aft mount. The lack of the aft mount allows the cantilevered engine and associated casing to pivot about the fan hub frame that the forward mount couples to. Further, the lack of the aft mount prevents the cantilevered engine from encountering bending moments. As such, the cantilevered engine provides an improved clearance between turbine blades and a casing of the engine (e.g., turbine blade tip and interstage seal clearance throughout the engine, clearance closure characteristics, carcass distortion) compared to an engine including the aft mount.

However, under extreme operating conditions, such as initial shock, hard landing, a fan blade out (e.g., loss of or damage to a fan blade during flight) causing a wind milling imbalance, etc., the cantilevered engine oscillates (e.g., wags, shakes, vibrates, etc.). The oscillation of the cantilevered core causes large loads on the forward mount and the associated fan hub frame. For example, movement of the trailing portion of the engine applies a significant load on the forward mount and/or the fan hub frame as the cantilevered engine pivots. In some instances, the resulting loads on the forward mount and/or the fan hub frame cause several significant design challenges which are difficult to overcome. Further, the forward mount requires significant additional material to withstand loads that can be encountered during flight of the aircraft.

In some examples, the engine includes the aft mount in addition to the forward mount to prevent displacement of the engine. However, under extreme operating conditions, the engine bends between the forward mount and the aft mount. Further, the bending between the forward mount and the aft mount obstructs turbine blade tip and interstage seal clearances throughout the engine (e.g., results in clearance distortion). For example, engine bending can cause the blade tips to contact the engine casing, which results in blade tip material loss from any blades at a particular rotor station. Further, lost blade tip material increases blade tip clearances, which can result in lost engine performance, unacceptable operability characteristics, and/or increased temperatures at certain locations throughout the engine.

Examples disclosed herein enable damper engine mount links configured to couple to an aircraft engine and to an aircraft mount. In some examples, an engine assembly includes a core (e.g., an engine core) with turbine blades (e.g., rotor vanes, stator vanes, etc.). In some examples, a fore portion of the core couples to a fan hub frame and an aft portion of the core couples to a turbine rear frame. In some examples, the engine assembly includes a casing that circumferentially surrounds the core. In some examples, the engine assembly includes a forward mount and a damper link (e.g., a squeeze film damper, a shock absorber, a rubber isolator, a wire mesh damper, a dashpot, a magnetorheological damper, etc.). In some such examples, a first longitudinal end of the forward mount couples to the fan hub frame and a second longitudinal end of the forward mount couples to the aircraft. In some examples, a first longitudinal end of the damper link couples to the turbine rear frame and a second longitudinal end of the damper link couples to the aircraft. As such, the damper link is implemented as an aft mount that supports the core. In some examples, the forward mount and the damper link couple to a pylon of the aircraft. In some examples, the forward mount includes a forward mount damper link.

In some examples, the pylon of the aircraft is in connection with a nacelle that circumferentially surrounds the casing of the core. In some such examples, at least one of the pylon or the nacelle couples to the forward mount and the damper link. For example, a plurality of damper links can be circumferentially positioned around the turbine rear frame or the turbine center frame and/or a plurality of forward mounts or forward mount damper links can be circumferentially positioned around the fan hub frame to couple the core to the aircraft. In some such examples, one or more of the plurality of damper links couples to a nacelle of the aircraft.

In some examples, longitudinal ends of the damper link include a clevis. In some such examples, a bearing of the engine core, the turbine rear frame, the fan hub frame, the pylon, and/or the nacelle includes an opening that corresponds with an opening of the clevis. In some examples, the clevis includes an opening with one or more slots. In some examples, a pin is inserted through the opening of the clevis and the opening of the bearing of the engine core, the turbine rear frame, the fan hub frame, the pylon, and/or the nacelle to couple the damper link to the engine core, the turbine rear frame, the fan hub frame, the pylon, and/or the nacelle. In other examples, the bearing of the engine core, the turbine rear frame, the fan hub frame, and/or the nacelle includes at least one clevis and the longitudinal ends of the damper link include openings that correspond with openings of the at least one clevis.

The damper link provides a resistance to movements of the core based on flight conditions, a position of the core, a position of the fan hub frame, a position of the damper link, and/or a length of the damper link. In some examples, the damper link provides more resistance to movements of the core under first flight conditions (e.g., fan blade out causing wind milling imbalance, initial shock, hard landing, etc.) compared to second flight conditions (e.g., cruise flight, takeoff rotation, etc.). As such, the damper link allows the core to move as a typical cantilevered core system would but provides a damping resistance in response to movements of the core that would be inefficient and/or dangerous. For example, the damper link can maintain a clearance distance between the turbine blades of the core and the casing that surrounds them to improve a specific fuel consumption of the aircraft. Further, the damper link maintains an alignment of the turbine blades to reduce an air flow path through the engine and further improve an efficiency of the engine.

The damper link prevents and/or reduces oscillations of the core that can cause damaging loads on the forward mount and the associated fan hub frame in a cantilevered engine. As a result, the forward mount of the engine assembly experiences reduced loads compared to the forward mount in the cantilevered engine and, thus, requires less support material. Further, the reduced loads prevent the forward mount and/or the fan hub frame from requiring heavier weight (i.e., more material) and more complex designs. As such, the damper link alleviates some key design challenges, which may reduce the weight of the aircraft and improve the fuel efficiency of the engine. In some examples, the damper link allows the core to move with some damping to prevent bending of the casing that occurs with a rigid aft mount. Further, the damper link can include an extension limit (e.g., a minimum extension length, a maximum extension length, etc.) to provide a rigid support under certain flight conditions, such as fan blade out, hard landing, initial shock, etc. As such, the extension limit depends on the engine and an area of implementation of the damper link.

In some examples, the damper link is an active damper link that is electronically controllable (e.g., by modulating current). In some examples, the stiffness of the damper link is determined based on engine operating parameters. For example, the engine operating parameters can indicate an instantaneous turbine blade tip and interstage seal clearance. Further, the stiffness of the damper link is modulated to adjust the turbine blade tip and interstage seal clearance. In some examples, a stiffness of the damper link is predetermined for certain engine operating parameters based on flight simulations, wind tunnel testing, etc. In some examples, an open-loop control system compares the stiffness of the damper link to the predetermined stiffness for the current engine operating parameters during flight of the aircraft. In turn, the control system adjusts the stiffness of the damper link in response to the stiffness of the damper link differing from the predetermined stiffness for the current engine operating parameters.

In some examples, a closed-loop control system modulates the stiffness of the damper link to determine a stiffness that optimizes the engine operating parameters during flight of the aircraft. In some examples, the control system implements various stiffnesses of the damper link during flight of the aircraft to determine the stiffness associated with the optimization of the flight parameter(s) of interest. For example, the stiffness of the damper link is modulated to determine a setting that reduces vibrations and/or a noise output of the engine. In some examples, the stiffness of the damper link is determined in response to a flagged flight condition, such as cruise flight, being encountered.

In some examples, a closed-loop control system determines the stiffness of the damper link based on a parameter determined by a sensor(s) (e.g., a strain gage, a pressure sensor, a thermocouple, an accelerometer, etc.). For example, an internal bearing, a casing, the forward mount, the fan hub frame, the pylon, the nacelle, the core engine, the turbine rear frame, the turbine center frame, flanges, internal structures, and/or the damper link can include the sensor(s). In some examples, an optimal output of the sensor(s) is predetermined for certain flight conditions. As a result, the control system modulates the stiffness of the damper link to determine a setting that implements the optimal output of the sensor(s).

Referring now to the drawings, FIG. 1 is a schematic cross-sectional view of a prior art example of an aircraft engine 100 that may incorporate various examples disclosed herein. As shown in FIG. 1, the aircraft engine 100 defines a longitudinal or axial centerline axis 102 extending therethrough for reference. In general, the aircraft engine 100 can include a core turbine or a core turbine engine 104 disposed downstream from a fan section 106.

The core turbine engine 104 can generally include a substantially tubular outer casing 108 that defines an annular inlet 110. The outer casing 108 can be formed from multiple segments. The outer casing 108 encloses, in serial flow relationship, a compressor section having a booster or low-pressure compressor 112 ("LP compressor 112") and a high-pressure compressor 114 ("HP compressor 114"), a combustion section 116, a turbine section having a high-pressure turbine 118 ("HP turbine 118") and a low-pressure turbine 120 ("LP turbine 120"), and an exhaust section 122. A high-pressure shaft or spool 124 ("HP shaft 124") drivingly couples the HP turbine 118 and the HP compressor 114. A low-pressure shaft or spool 126 ("LP shaft 126") drivingly couples the LP turbine 120 and the LP compressor 112. The LP shaft 126 can also couple to a fan shaft or spool 128 of the fan section 106. In some examples, the LP shaft 126 can couple directly to the fan shaft 128 (i.e., a direct-drive configuration). In alternative configurations, the LP shaft 126 may couple to the fan shaft 128 via a reduction gear 130 (i.e., an indirect-drive or geared-drive configuration).

As shown in FIG. 1, the fan section 106 includes a plurality of fan blades 132 ("fan 132") coupled to and extending radially outwardly from the fan shaft 128. A first annular fan casing or first nacelle 134 circumferentially encloses the fan section 106 and/or at least a portion of the core turbine engine 104. The aircraft engine 100 includes a second nacelle 135 opposite the first nacelle 134. The nacelles 134, 135 can be supported relative to the core turbine engine 104 by a forward mount 136. Furthermore, a downstream section 138 of the nacelles 134, 135 can enclose an outer portion of the core turbine engine 104 to define a bypass airflow passage 140 therebetween.

As illustrated in FIG. 1, air 142 enters an intake or inlet portion 144 of the aircraft engine 100 during operation thereof. A first portion 146 of the air 142 flows into the bypass flow passage 140, while a second portion 148 of the air 142 flows into the inlet 110 of the LP compressor 112. One or more sequential stages of LP compressor stator vanes 150 and LP compressor rotor blades 152 (e.g., turbine blades) coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 where one or more sequential stages of HP turbine stator vanes 162 and HP turbine rotor blades 164 coupled to the HP shaft 124 extract a first portion of kinetic and/or thermal energy therefrom. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the aircraft engine 100, the core turbine 104 serves a similar purpose and sees a similar environment in land-based turbines, turbojet engines in which the ratio of the first portion 146 of the air 142 to the second portion 148 of the air 142 is less than that of a turbofan, and unducted fan engines in which the fan section 106 is devoid of the nacelles 134, 135. In each of the turbofan, turbojet, and unducted engines, a speed reduction device (e.g., the reduction gearbox 130) can be included between any shafts and spools. For example, the reduction gearbox 130 can be disposed between the LP shaft 126 and the fan shaft 128 of the fan section 106.

As depicted therein, the aircraft engine 100 defines an axial direction A, a radial direction R, and a circumferential direction C. In general, the axial direction A extends generally parallel to the axial centerline axis 102, the radial direction R extends orthogonally outwardly from the axial centerline axis 102, and the circumferential direction C extends concentrically around the axial centerline axis 102.

Figure 2:
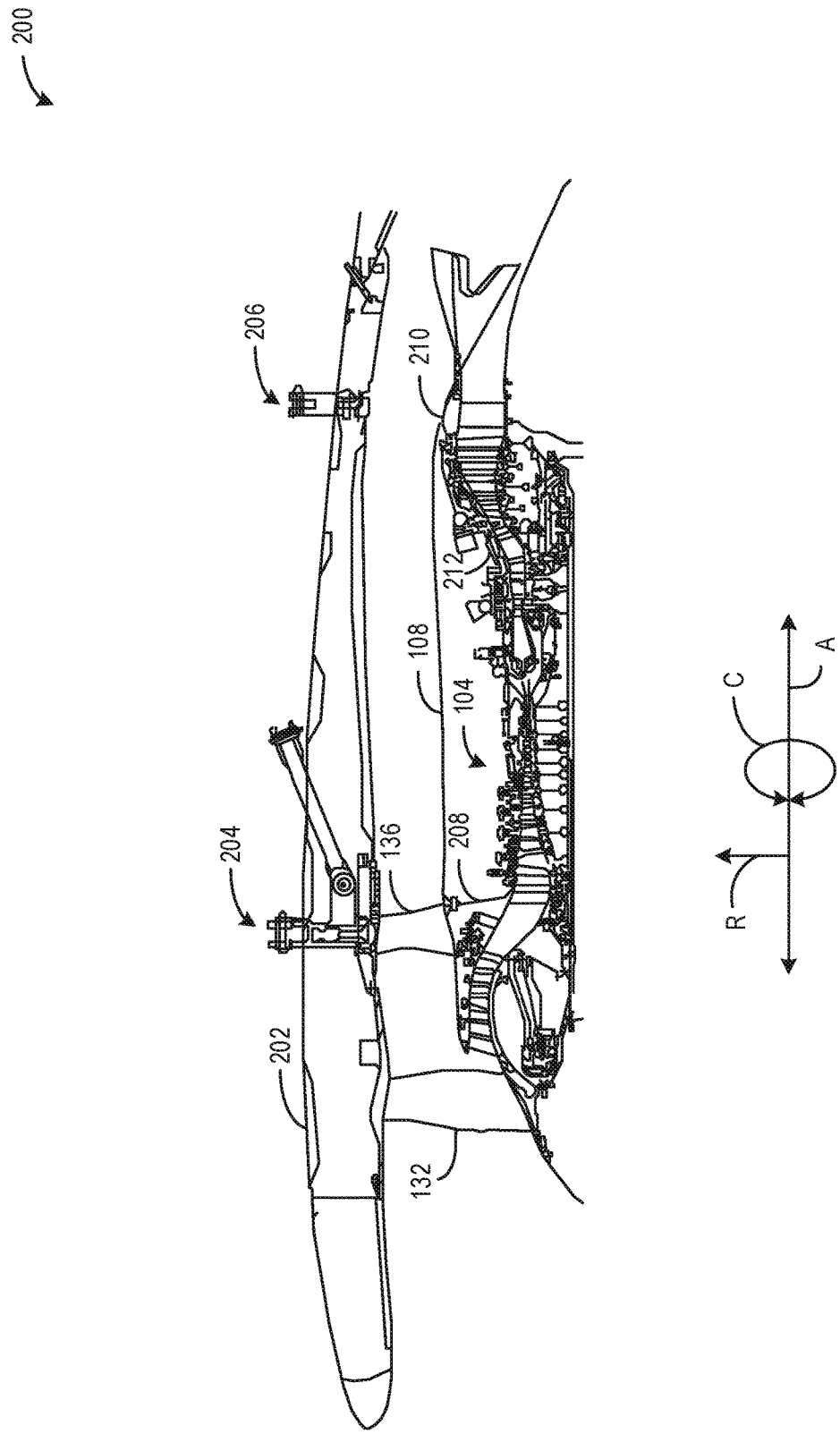
FIG. 2 illustrates a prior art example of an aircraft engine with a forward mount.

FIG. 2 illustrates a prior art example of a cantilevered aircraft engine 200. In FIG. 2, the cantilevered engine 200 includes the core turbine engine 104, the outer casing 108, the turbine blades 132, and the forward mount 136 of FIG. 1. Further, the cantilevered engine assembly 200 includes a pylon 202, a fan hub frame 208, a turbine rear frame 210, and a turbine center frame. In FIG. 2, the pylon 202 includes a fore attachment point 204 and an aft attachment point 206. In FIG. 2, the forward mount 136 couples to the fore attachment point 204 and to the fan hub frame 208. In FIG. 2, the core turbine engine 104 is supported by the forward mount 136. As a result, the forward mount 136 and the fan hub frame 208 experience significant loads (e.g., damaging loads and/or otherwise undesirable loads, etc.) during operation, as discussed further in association with FIG. 3.

Figure 3:
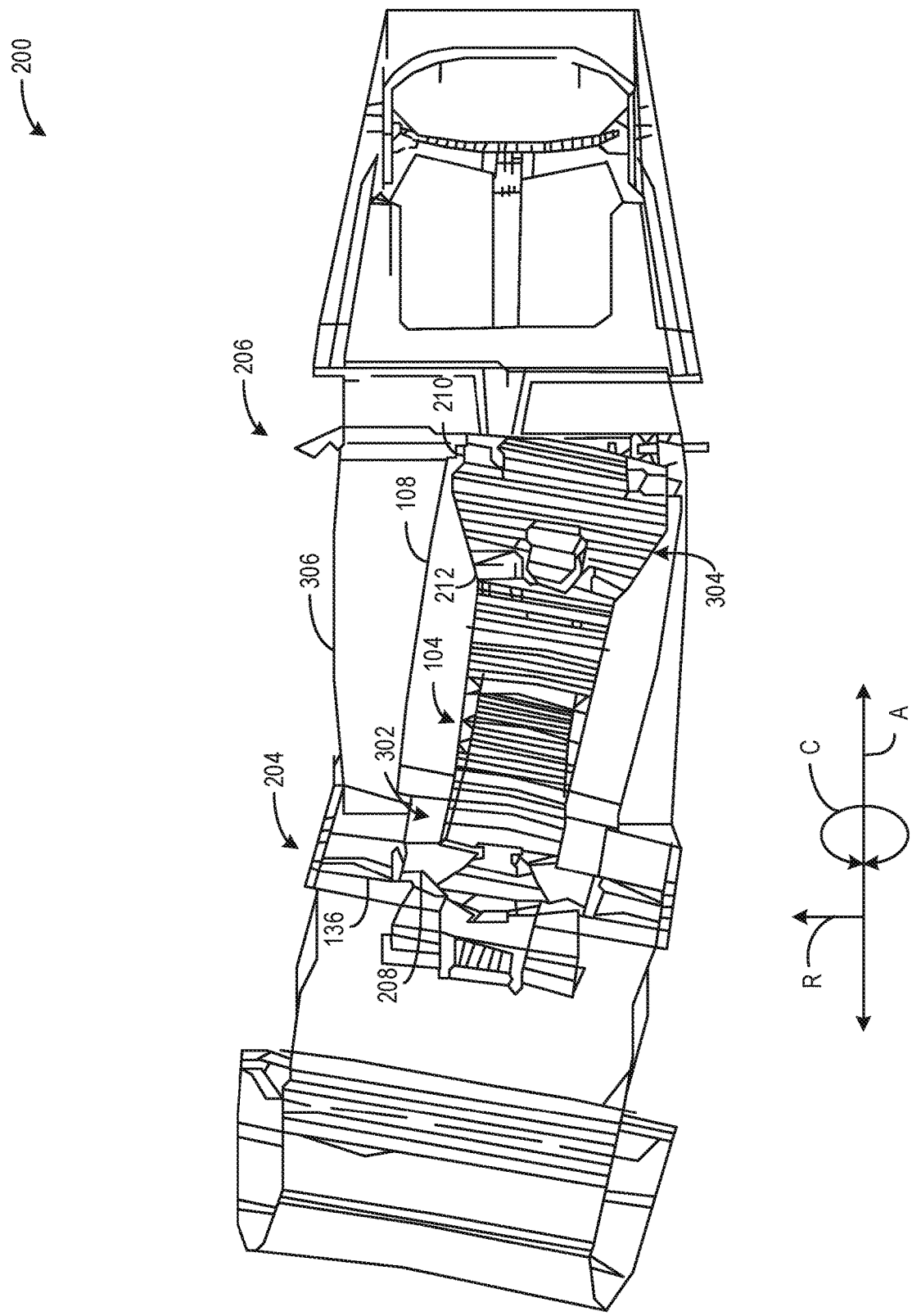
FIG. 3 illustrates the prior art example of the aircraft engine of FIG. 2 under extreme operating conditions.

FIG. 3 illustrates the cantilevered aircraft engine 200 of FIG. 2 in example operation. In FIG. 3, the core turbine engine 104 couples to the fan hub frame 208 and to the turbine rear frame 210. In some examples, a fore portion of the core 302 and the outer casing 108 couple to the fan hub frame 208. In FIG. 3, the forward mount 136 couples the fan hub frame 208 to the fore attachment point of the pylon 204. In FIG. 3, an aft portion of the core 304 is coupled to the turbine rear frame 210. In FIG. 3, the turbine rear frame 210 is not coupled to the aft attachment point of the pylon 206, which allows the core turbine engine 104 to be cantilevered. In some examples, the core turbine engine 104 is fixed at the fan hub frame 208 along with the outer casing 108 allowing the outer casing 108 to pivot about the fan hub frame 208 with the core turbine engine 104. Further, a clearance between the core turbine engine 104 and the outer casing 108 is maintained as they share a similar pivot point. In some examples, maintaining the clearance between the core turbine engine 104 and the outer casing 108 maintains an efficiency of the cantilevered aircraft engine 200.

In example operation, such as fan blade out, wind milling load, initial shock, etc., the core turbine engine 104 oscillates (e.g., shake, wag, etc.) while pivoting about the fan hub frame 208. In other words, a fore portion of the core 302 maintains a relative position thereof while pivoting with the fan hub frame 208 as an aft portion of the core 304 oscillates within a nacelle (e.g., the lower nacelle 134, the upper nacelle 135, etc.) 306. As a result, the forward mount 136 and/or the fan hub frame 208 encounter significant loads as the aft portion of the core 304 wags. In some examples, additional support materials and/or structures are implemented within the forward mount 136 and/or the fan hub frame 208 to help ensure that they are able to support the significant loads encountered as the aft portion of the core 304 moves. In some examples, the outer casing 108 contacts an inner wall of the nacelle 306, which causes structural damage at the nacelle 306, the outer casing 108, the core turbine engine 104, the fan hub frame 208, and/or the forward mount 136.

Figure 4:
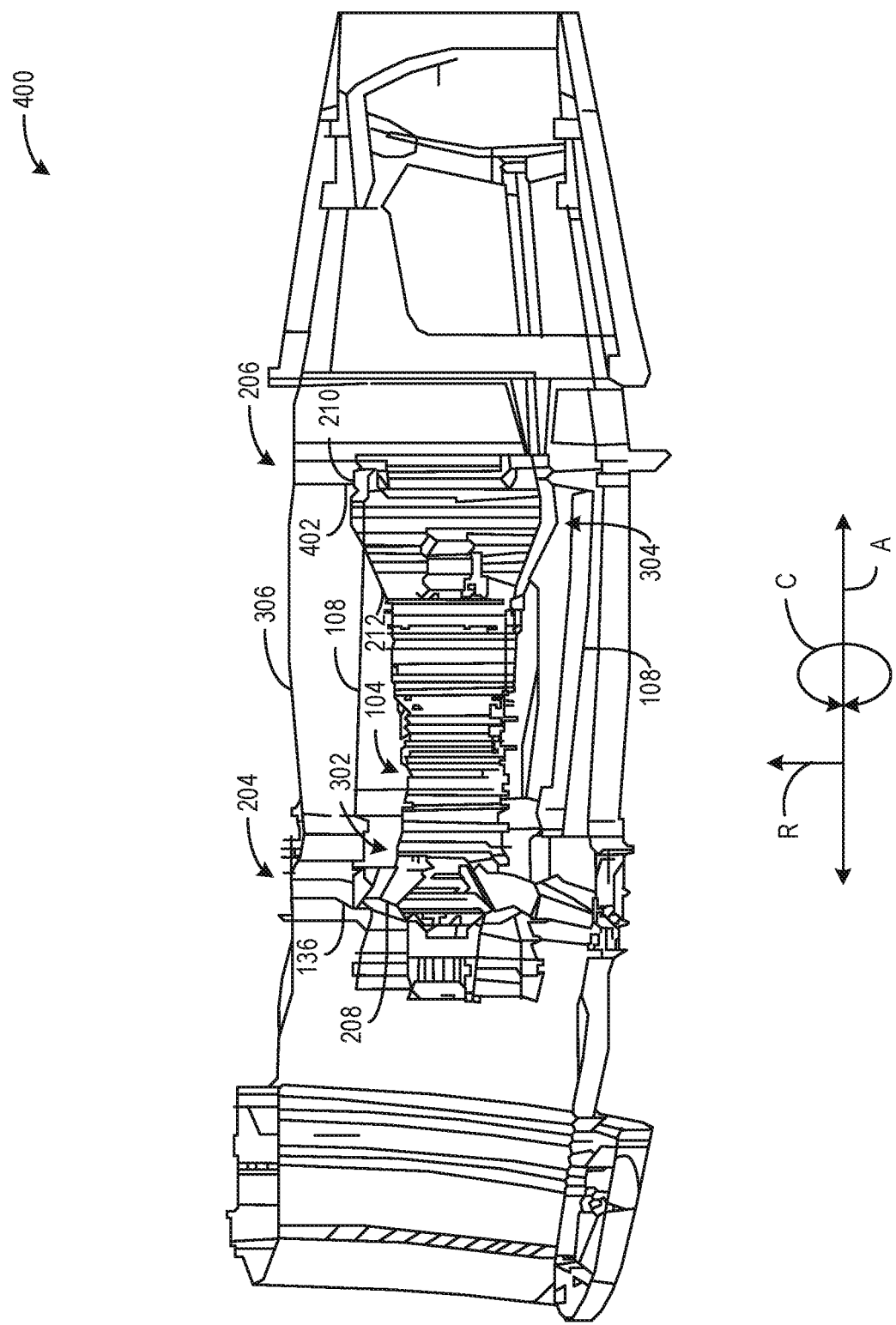
FIG. 4 illustrates a prior art example of an aircraft engine with a forward mount and an aft mount under the same extreme operating conditions as in FIG. 3

FIG. 4 illustrates a prior art example of an aircraft engine 400 supported by a rigid aft mount 402 in addition to the forward mount 136 of FIGS. 1, 2, and 3. In FIG. 4, the core turbine engine 104 couples to the fan hub frame 208 and to the turbine rear frame 210. Specifically, the fore portion of the core 302 couples to the fan hub frame 208 and the aft portion of the core 304 couples to the turbine rear frame 210. In FIG. 4, the outer casing 108 couples to the fan hub frame 208. In FIG. 4, the forward mount 136 couples to the fan hub frame 208 and to the fore attachment point of the pylon 204. In FIG. 4, the rigid aft mount 402 couples to the turbine rear frame and to the aft attachment point of the pylon 206.

In FIG. 4, during extreme operations, such as fan blade out causing wind milling imbalance, hard landing, initial shock, etc., the outer casing 108 oscillates about the fan hub frame 208. However, the rigid aft mount 402 and the forward mount 136 maintain a relative position of the core turbine engine 104. As a result, an inner wall of the outer casing 108 can collide with the core turbine engine 104, which can damage the outer casing and/or the core turbine engine 104 and reduce an efficiency of the aircraft engine 400. Further, the core turbine engine 104 experiences a bending moment between the forward mount 136 and the rigid aft mount 402. Specifically, the rigid aft mount maintains a fixed position of the aft portion of the core 304 while the fore portion of the core 302 pivots with the fan hub frame 208. In some examples, the fixed position of the aft portion of the core 304 obstructs the outer casing 108 as it pivots about the fan hub frame 208. In some examples, a clearance between the core turbine engine 104 is distorted as the outer casing 108 pivots and the rigid aft mount 402 maintains a relative position of the core turbine engine 104.

Figure 5A:
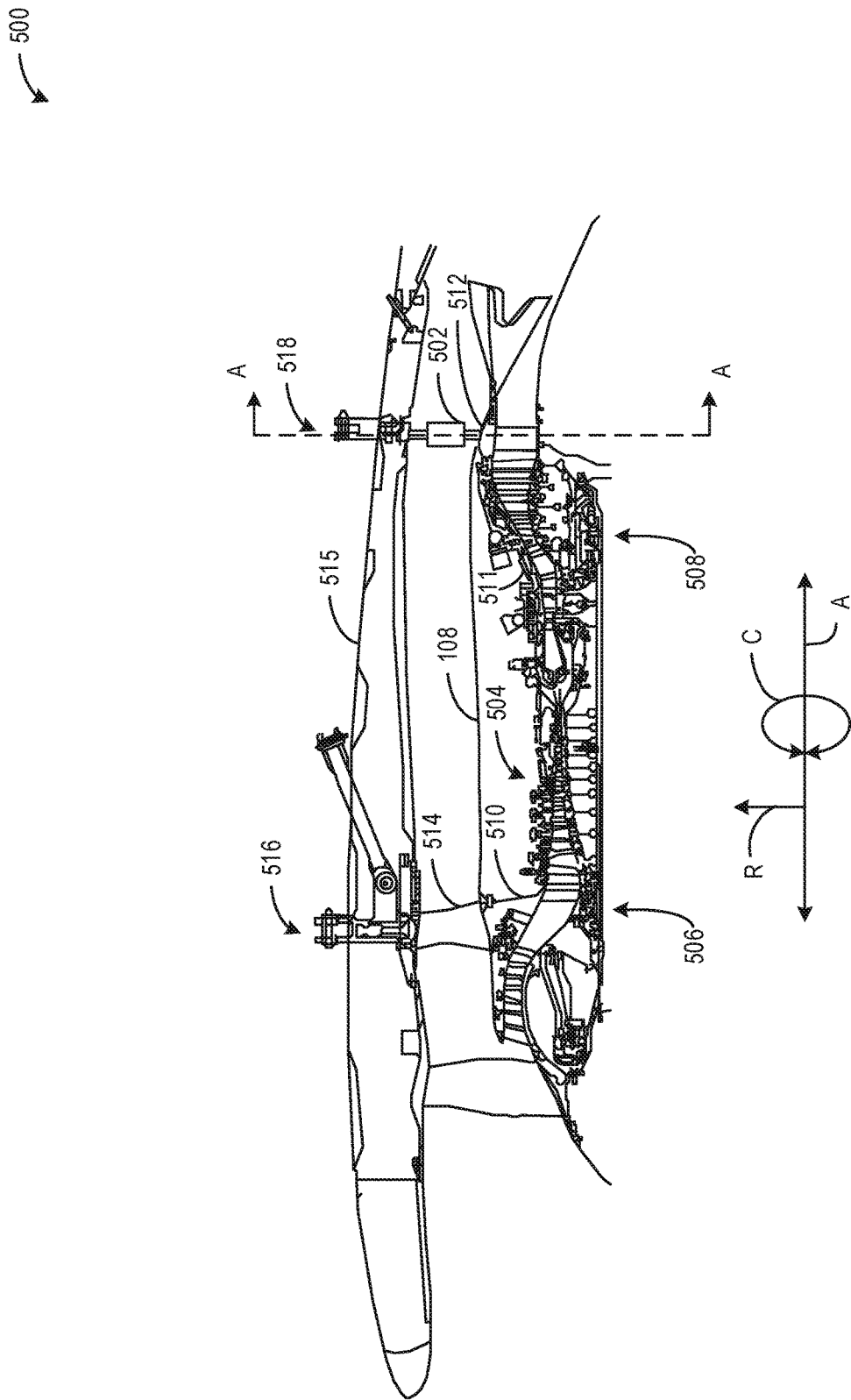

FIG. 5A illustrates an example engine assembly 500 including an aft mount damper link (e.g., a rubber isolator, a wire mesh damper, a dashpot, a magnetorheological damper, a squeeze film damper, etc.) 502. In FIG. 5A, the engine assembly includes an engine core 504 and a pylon 515 in connection with a wing of an aircraft. In some examples, the pylon 515 is in connection with a nacelle that circumferentially surrounds the engine core 504, as discussed further in association with FIGS. 6A-B. In FIG. 5A, the engine core 504 includes a fore portion 506 coupled to a fan hub frame 510 and an aft portion 508 coupled to a turbine center frame 511 and/or a turbine rear frame 512. In FIG. 5A, the fan hub frame 510 couples to a first end of a forward mount 514 and the turbine rear frame 512 couples to a first end of the damper link 502. In FIG. 5A, the pylon 515 includes a fore attachment point 516 and an aft attachment point 518. In FIG. 5A, the fore attachment point of the pylon 516 couples to a second end of the forward mount 514 and the aft attachment point of the pylon 518 couples to a second end of the damper link 502.

In FIG. 5A, the damper link 502 provides a resistance (e.g., damping) to movements of the engine core 504 based on flight conditions of the aircraft. In some examples, the damping is proportional to a rate of the movements of the engine core 504. Further, the damping that the damper link 502 provides can be based on a position of the damper link 502 relative to the engine core 504. As such, in some examples, the damper link 502 includes a stiffness that is proportional to the rate of movements of the engine core 504 and/or a direction of those movements to reduce, restrict, and/or prevent displacement of the engine core 504. Specifically, the damper link 502 can be active (e.g., a controllable damper link), which allows an open or closed-loop control system to adjust a stiffness of the damper link 502 in response to movements of the engine core 504 based on the rate of movement and/or a position of the engine core 504. For example, the damper link 502 provides more resistance to movements of the engine core 504 under first flight conditions, such as fan blade out causing wind milling imbalance, initial shock, hard landing, maneuvers, etc., compared to second flight conditions, such as cruise flight. In some examples, the damper link 502 is passive (e.g., a squeeze film damper, a wire mesh damper, a shock absorber, etc.) and includes a stiffness based on the rate of movement of the engine core 504. In some such examples, a stiffness of the damper link 502 is based on the area of implementation and the rate of movements typically encountered there to provide a sufficient damping ratio. In some examples, the damper link 502 preserves a clearance between the engine core 504 and the outer casing 108 to improve a specific fuel consumption, an operability, and/or deterioration characteristics of the engine assembly 500. Further, the damper link 502 maintains an alignment of turbine blades (e.g., rotor blades, stator vanes, etc.) associated with the engine core 504.

In FIG. 5A, the damper link 502 supports the engine core 504 to reduce the load on the fan hub frame 510 and/or the forward mount 514. For example, the damper link 502 can maintain a fixed length at a maximum, or minimum, extension limit to provide a rigid support to the engine core 504 during extreme flight conditions, such as wind milling imbalance, maneuvers, hard landing, initial shock, etc. As a result, the damper link 502 enables the forward mount 514 and/or the fan hub frame 510 to be constructed with less support material (e.g., a lower weight) due to the reduced loads that the forward mount 514 and the fan hub frame 510 encounter.

In some examples, the damper link 502 is a controllable damper (e.g., a magnetorheological damper) with an adjustable fluid stiffness. In some such examples, the controllable damper modulates the adjustable fluid stiffness based on flight conditions, a position of the fan hub frame 510, and/or a position of the engine core 504. In some examples, the controllable damper modulates the stiffness thereof in substantially real time to control a clearance between turbine blade tips and interstage seals of the engine core 504. In some examples, the damper link 502 controls vibrations of the engine core 504. In some such examples, the damper link 502 controls a noise output of the engine assembly 500.

Figure 5B:
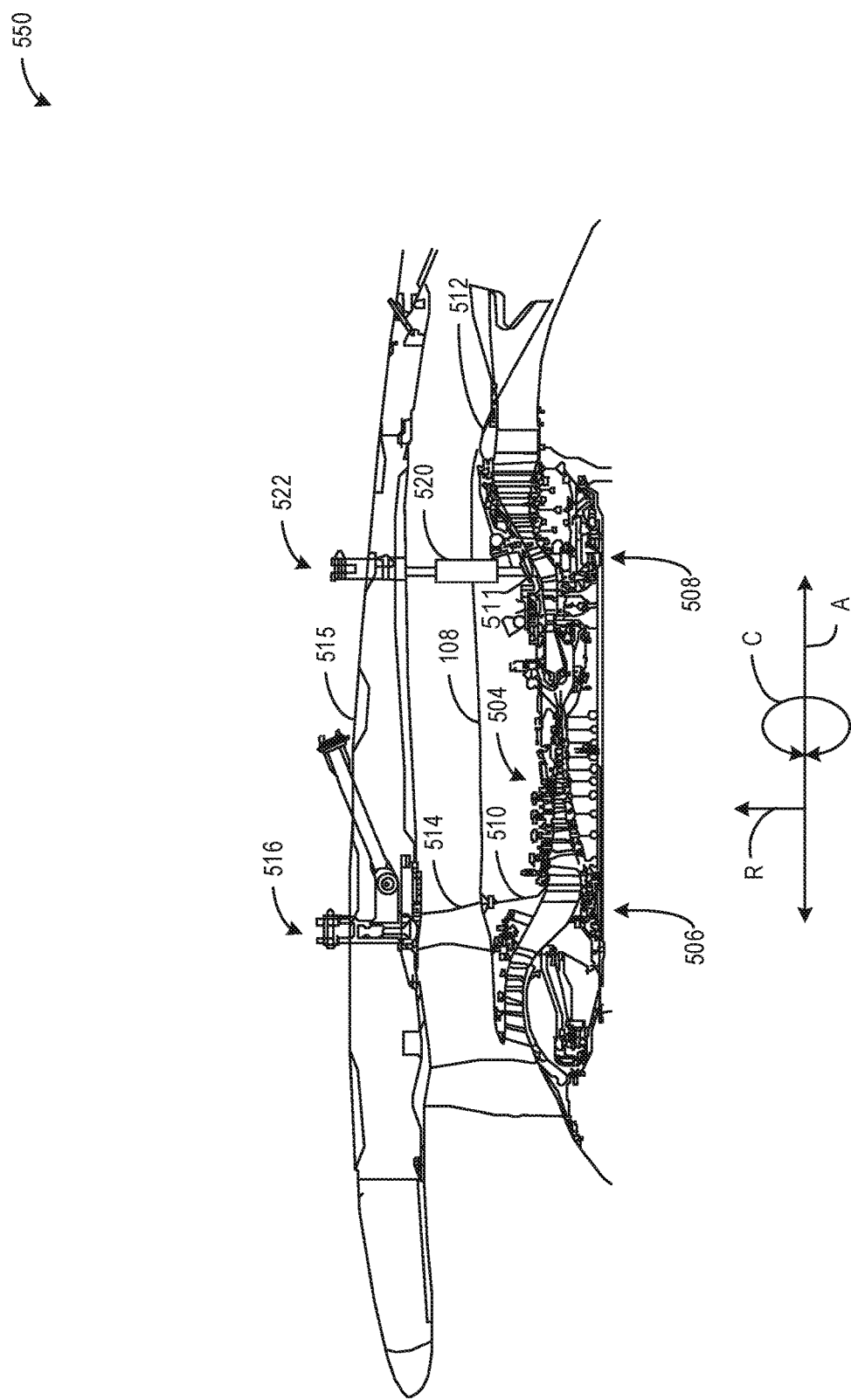

FIG. 5B illustrates an example engine assembly 550 including a damper link 520 coupled to the turbine center frame 511, as opposed to the turbine rear frame 512 shown in FIG. 5A. In FIG. 5B, the engine assembly 550 includes the engine core 504 including the fore portion 506 coupled to the fan hub frame 510 and the aft portion 508 coupled to the turbine center frame 511. The engine assembly 550 further includes the pylon 515 including a fore attachment point 516 and an aft attachment point 522. In FIG. 5B, a first end of the damper link 520 is coupled to the turbine center frame 511 and a second end of the damper link 520 is coupled to the aft attachment point of the pylon 522. In some examples, the damper link 520 spans through the outer casing 108 to couple the engine core 504 to the pylon 515. For example, a strut can cover the damper link 520 and span through the outer casing 108. In FIG. 5B, the damper link 520 provides a stiffness to support the engine core 504 based on a length of the damper link 520, a rate of change of the length of the damper link 520, and/or a determined operating condition of the engine assembly 550.

FIG. 5C illustrates an example engine assembly 575 including a forward mount damper link 524. In FIG. 5C, a first end of the forward mount damper link 524 couples to the fore attachment point of the pylon 516 and a second end of the forward mount damper link 524 couples to the fan hub frame 510. In some examples, the forward mount damper link 524 provides a stiffness to support the engine core 504 based on a position and/or movement of the fan hub frame 510. In some examples, the forward mount damper link 524 is smaller than the aft mount damper links 502, 520. In some examples, the forward mount damper link 524 encounters lower temperatures than the aft mount damper links 502, 520 and, thus, may have reduced temperature capabilities compared to the aft mount damper links 502, 520.

Figure 6A:
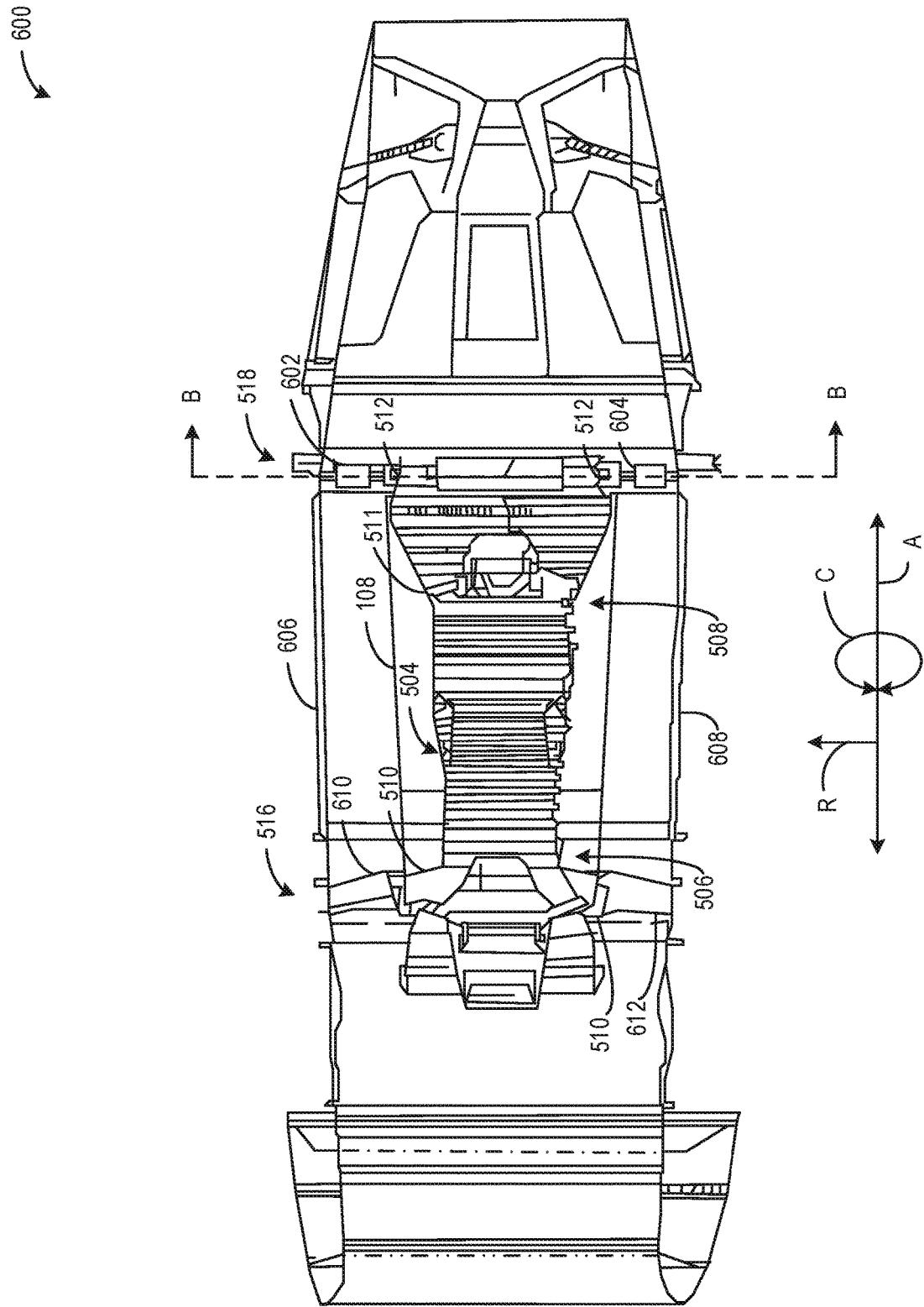

FIG. 6A illustrates an example engine assembly 600 including a first damper link (e.g., an upper damper link aft mount, the damper link 502) 602 and a second damper link (e.g., a lower damper link aft mount, the damper link 502) 604 to couple the engine core 504 to an aircraft. In FIG. 6A, the engine assembly 600 further includes a first forward mount (e.g., an upper forward mount, the forward mount 514, etc.) 610 and a second forward mount (e.g., a lower forward mount, the forward mount 514, etc.) 612. In FIG. 6A, the engine assembly 600 further includes an upper portion of a nacelle 606 and a lower portion of a nacelle 608. In some examples, the upper portion of the nacelle 606 is in connection with and/or includes the pylon 515 of the aircraft.

In FIG. 6A, the fore portion of the core 506 is mounted to the fan hub frame 510 by the upper forward mount 610 and the lower forward mount 612 that couple to the fan hub frame 510. In FIG. 6A, the upper forward mount 610 couples to an upper portion of the fan hub frame 510 and to the fore attachment point of the pylon 515 and/or the upper portion of the nacelle 606. In FIG. 6A, the lower forward mount 612 couples to a lower portion of the fan hub frame 510 and the lower portion of the nacelle 608.

In FIG. 6A, the aft portion of the core 508 is mounted by the upper damper link aft mount 602 and the lower damper link aft mount 604. Specifically, the upper damper link aft mount 602 couples to the aft attachment point of the pylon 518 and/or the upper portion of the nacelle 606 and to an upper portion of the turbine rear frame 512. Further, the lower damper link aft mount 604 couples to a lower portion of the turbine rear frame 512 and to the lower portion of the nacelle 608. In some examples, the upper damper link aft mount 602 and the lower damper link aft mount 604 are positioned in a radial direction, a laterally tilted direction, and/or an axially tilted direction relative to the engine core 504. In some examples, additional ones of the damper link 502 couple to lateral portions of the turbine rear frame 512 and to lateral portions of a nacelle, as discussed further in association with FIG. 8.

In FIG. 6A, the upper and lower damper link aft mount 602, 604 provide a resistance to movements of the engine core 504 based on flight conditions, a position of the fan hub frame 510 (e.g., an angular orientation of the fan hub frame 510), a position of the turbine rear frame 512, a position of the engine core 504, a position of the upper or lower damper link 602, 604, and/or a length of the upper or lower damper link 602, 604. In some examples, the upper damper link aft mount 602 provides a first resistance to movements of the engine core 504 and the lower damper link aft mount 604 provides a second resistance to movements of the engine core 504 different from the first resistance. In FIG. 6A, the upper damper link aft mount 602 and the lower damper link aft mount 604 maintain a clearance between turbine blades of the engine core 504 and the outer casing 108. In some examples, the upper and lower damper link aft mount 602, 604 maintain an alignment of the turbine blades of the engine core 104 to maintain or improve an efficiency (e.g., a specific fuel consumption, a power output, etc.) of the engine core 104 that would otherwise be affected by flight conditions.

FIG. 6B illustrates an example engine assembly 650 including an upper damper link 614 and a lower damper link 616 to couple to the turbine center frame 511, as opposed to the turbine rear frame 512 shown in FIG. 6A. In FIG. 6B, the engine assembly 650 includes the engine core 504 including the fore portion 506 coupled to the fan hub frame 510 and the aft portion 508 coupled to the turbine center frame 511. In FIG. 6B, a first end of the lower damper link 616 couples to the turbine center frame 511 and a second end of the lower damper link 616 couples to the lower portion of the nacelle 608. Further, a first end of the upper damper link 614 couples to the turbine center frame 511 and a second end of the upper damper link 614 couples to the upper portion of the nacelle 606. In some examples, a stiffness of the upper damper link 614 and/or the lower damper link 616 is based on a position of the turbine center frame 511. In some examples, the stiffness of the upper and lower damper link 614, 616 are modulated during flight of an aircraft to optimize engine operating parameters, such as a turbine blade tip and interstage seal clearance of the engine core 504.

FIG. 6C illustrates an example engine assembly 675 including an upper forward mount damper link 618 and a lower forward mount damper link 620. In FIG. 6C, a first end of the upper forward mount damper link 618 couples to the upper portion of the nacelle 606 and a second end of the upper forward mount damper link 618 couples to the fan hub frame 510. In FIG. 6C, a first end of the lower forward mount damper link 620 couples to the lower portion of the nacelle 608 and a second end of the lower forward mount damper link 620 couples to the fan hub frame 510. In some examples, a stiffness of the upper and/or lower forward mount damper links 618, 620 is adjusted in response to the stiffness of the upper and/or lower forward mount damper links 618, 620 differing from a predetermined stiffness for the current engine operating parameters.

Figure 7:
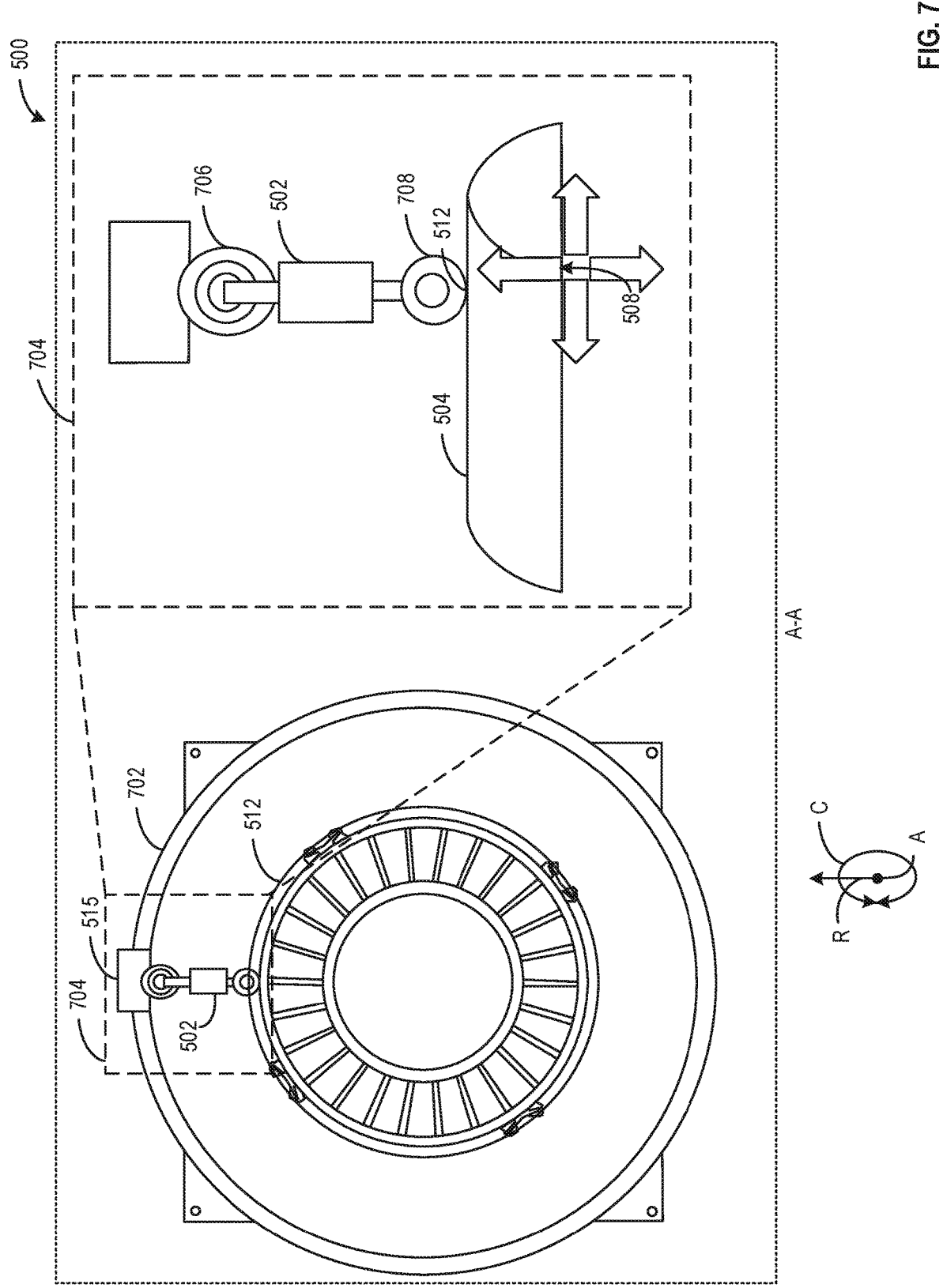
FIG. 7 illustrates an aft looking forward view from the rear of an aircraft engine of FIGS. 5A-C.

FIG. 7 illustrates a first example cross section A-A of the example engine assembly 500 of FIG. 5A. In FIG. 7, the damper link 502 couples to the pylon 515 and to the turbine rear frame 512. In FIG. 7, the pylon 515 is in connection with a nacelle (e.g., the upper portion of the nacelle 606, the lower portion of the nacelle 608, etc.) 702 that circumferentially surrounds the turbine center frame 511 and the turbine rear frame 512 and, thus, the engine core 504. In FIG. 7, a magnified view 704 further illustrates a first longitudinal end of the damper link 706 coupled to the pylon 515 and a second longitudinal end of the damper link 708 coupled to the engine core 504 via the turbine rear frame 512.

In FIG. 7, the damper link 708 provides a resistance to movements of the aft portion of the engine core 508. In some examples, the aft portion of the engine core 508 moves in the radial direction R and/or the circumferential direction C. As such, the damper link 708 resists the movements of the aft portion of the engine core 508 in the radial direction R and the circumferential direction C to maintain a clearance between the engine core 504 and the outer casing 108 and an alignment of the turbine blades of the engine core 104. Further, the damper link 708 adjusts the resistance to movements of the aft portion of the engine core 508 to allow the engine core 504 to pivot about the fan hub frame 510 with the outer casing 108 while preventing collisions between the engine core 504, the outer casing 108, the nacelle 702, and/or the pylon 515.

In some examples, the pylon 515, the nacelle 702, the engine core 504, the turbine center frame 511, and/or the turbine rear frame 512 include a clevis (not shown). In some such examples, the first and second longitudinal ends of the damper link 706, 708 include a bearing with a slot that corresponds with an opening of the clevis, as discussed further in association with FIG. 9. In some examples, the first and second longitudinal ends of the damper link 706, 708 include the clevis. In some such examples, the pylon 515, the nacelle 702, the engine core 504, and/or the turbine rear frame 512 include the bearing with the slot that corresponds with the opening of the clevis, as discussed further in association with FIG. 10. In some examples, the opening of the clevis includes one or more slots that align with the slot of the bearing. Further, the engine assembly 500 includes pins to be inserted through the opening of the devises and the associated slots to couple the damper link 502 to the engine core 504 (via the turbine rear frame 512) and to the pylon 515 or the nacelle 702.

Figure 8:
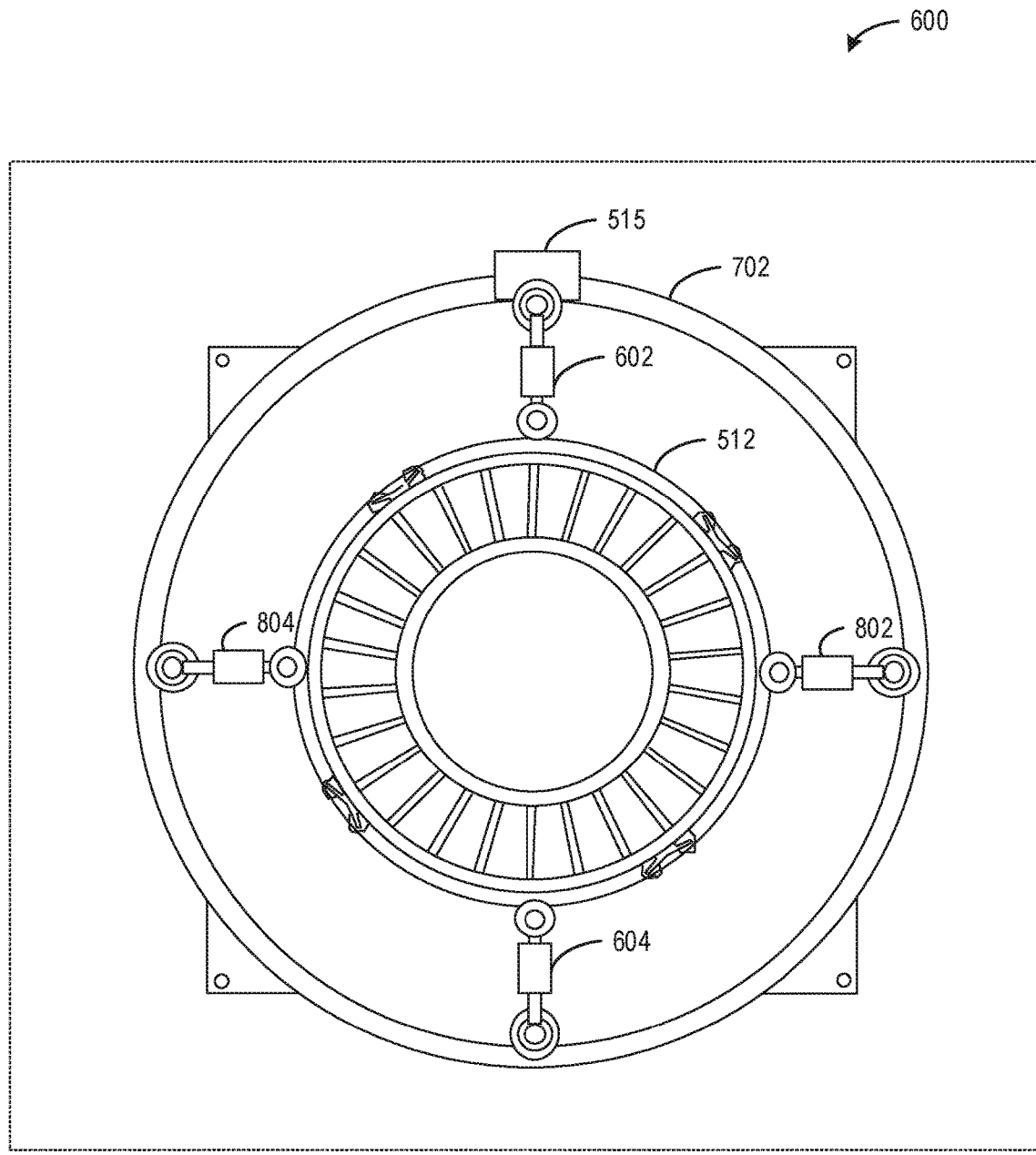
FIG. 8 illustrates an aft looking forward view from the rear of the example aircraft engine of FIGS. 6A-C.
Figure 8:
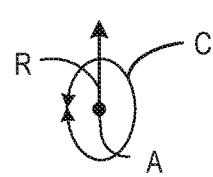

FIG. 8 illustrates an example cross section B-B of the example engine assembly 600 of FIG. 6A. In FIG. 8, the engine assembly 600 includes the upper and lower damper link aft mounts 602, 604 to couple to the turbine rear frame 512 and to the pylon 515 or the nacelle 702. In FIG. 8, the engine assembly 600 further includes a first lateral damper link aft mount 802 and a second lateral damper link aft mount 804 to couple to the nacelle 702 and to the turbine rear frame 512. As such, a plurality of damper links 602, 604, 802, 804 are circumferentially positioned around the turbine rear frame 512 to support the aft portion of the engine core 508.

In FIG. 8, the plurality of damper links 602, 604, 802, 804 each includes a stiffness that correspond to a position of the damper link 602, 604, 802, 804, a length of the damper link 602, 604, 802, 804, and/or a rate of change of the length (e.g., a velocity) of the damper link 602, 604, 802, 804. In some examples, movement of the engine core 504 results in a change in the position and/or the length of the damper links 602, 604, 802, 804 which changes the stiffness of the damper links 602, 604, 802, 804. In some examples, the upper and lower damper link aft mounts 602, 604 and the first and second lateral damper link aft mounts 802, 804 include a first, second, third, and fourth stiffness, respectively, corresponding to the length and/or the position of the damper links 602, 604, 802, 804. For example, during extreme operating conditions, such as a wind milling imbalance, initial shock, hard landing, maneuvers, etc., that cause the engine core 504 to oscillate, the stiffnesses of the damper links 602, 604, 802, 804 correspond with a position of the engine core 504. As such, the stiffnesses of the damper link 602, 604, 802, 804 is modulated based on a position of the engine core 504, a movement of the engine core 504, and/or flight conditions of the aircraft as the engine core 504 oscillates to reduce a load on the forward mount 610, 612 and the fan hub frame 510.

Figure 9:
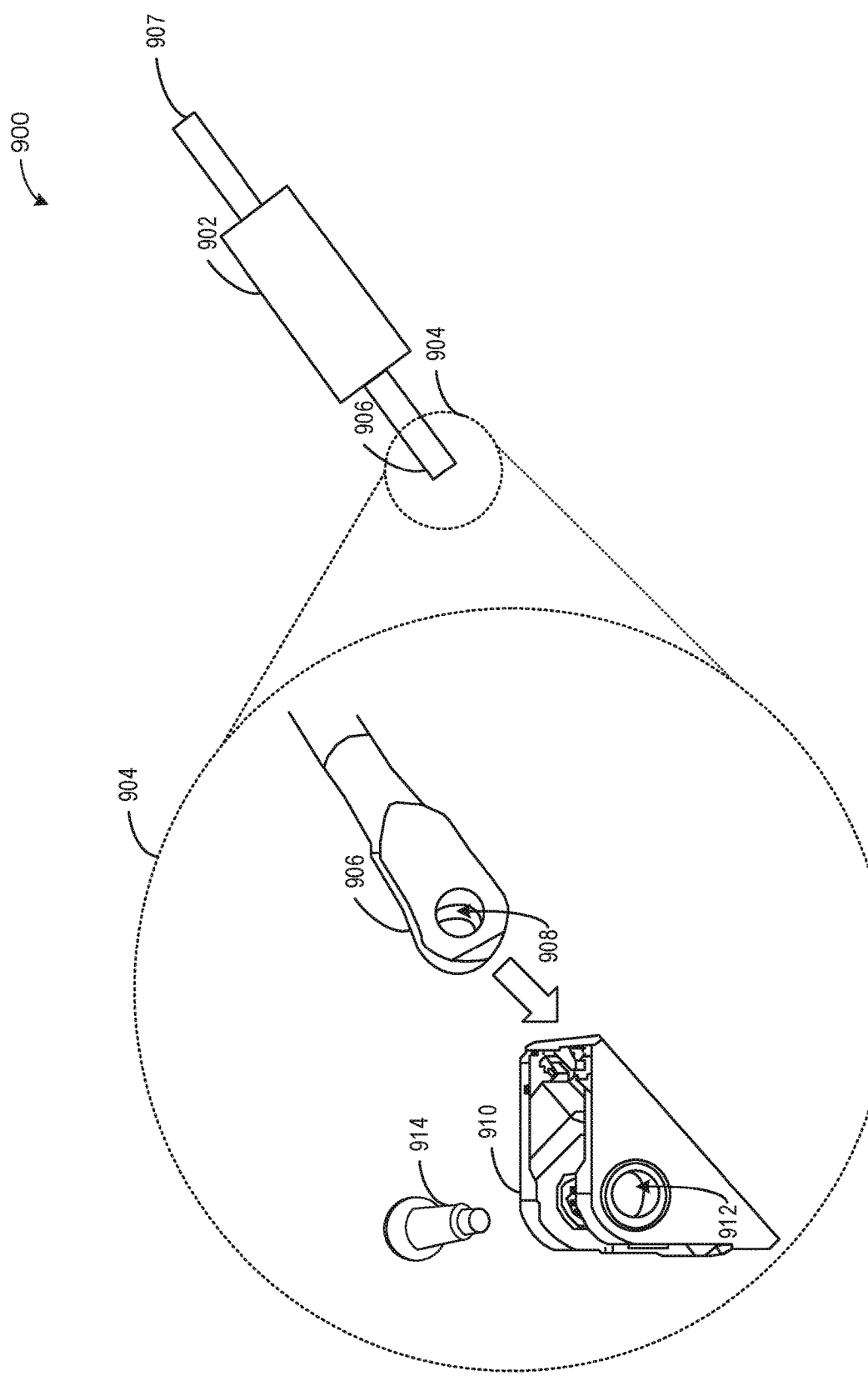
FIG. 9 illustrates a first example longitudinal end of the damper link of FIGS. 5A-C, 6A-C, 7, and/or 8 and a first example associated connection.

FIG. 9 illustrates a first example damper link 902 of FIGS. 5A-C, 6A-C, 7, and/or 8 and an associated connection 900. In some examples, the associated connection 900 is between the damper link 902 and the turbine center frame 511, the turbine rear frame 512, the fan hub frame 510, the pylon 515, and/or the nacelle 702. For example, a first longitudinal end of the damper link 906 couples to the turbine rear frame 512 and a second longitudinal end of the damper link 907 couples to the pylon 515 or the nacelle 702 when the damper link 902 is implemented as an aft mount attachment for the engine core 504.

FIG. 9 includes a magnified view 904 of the first longitudinal end of the damper link 906. In FIG. 9, the first longitudinal end of the damper link 906 includes a slot (e.g., an opening) 908. In some examples, the first longitudinal end of the damper link 906 is positioned within a clevis 910. In some examples, the turbine rear frame 512, the fan hub frame 510, the pylon 515, and/or the nacelle 702 include the clevis 910. In FIG. 9, the clevis 910 includes an opening with one or more slots 912. In some examples, the one or more slots 912 of the clevis 910 align with the slot 908 of the first longitudinal end of the damper link 906. In FIG. 9, a pin 914 is inserted through the one or more slots 912 of the clevis 910 and the slot 908 of the first longitudinal end of the damper link 906 to couple the damper link 902 to the fan hub frame 510, the turbine rear frame 512, the pylon 515, and/or the nacelle 702.

Figure 10:
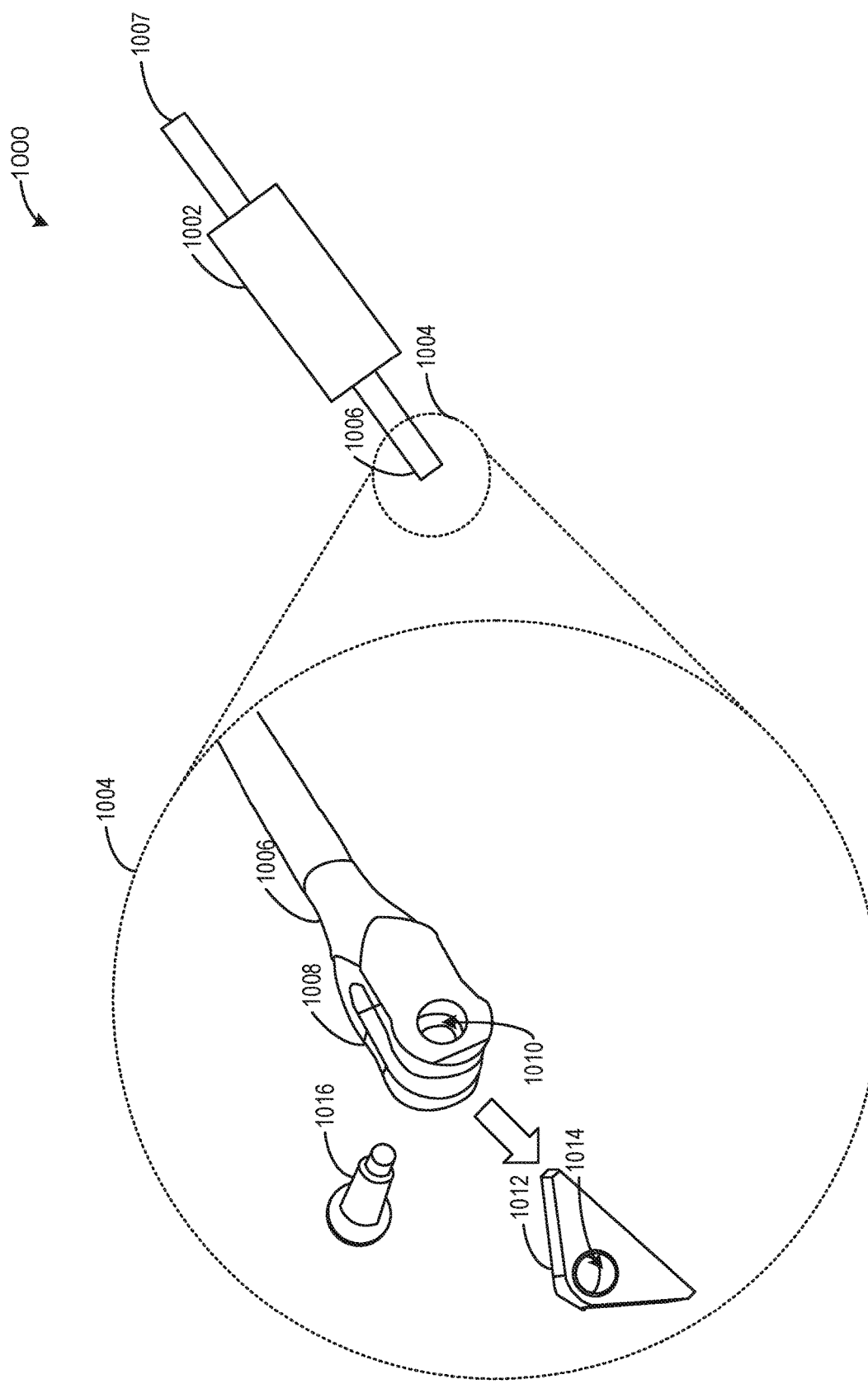
FIG. 10 illustrates a second example longitudinal end of the damper link of FIGS. 5A-C, 6A-C, 7, and/or 8 and a second example associated connection.

FIG. 10 illustrates a second example damper link 1002 of FIGS. 5A-C, 6A-C, 7, and/or 8 and an associated connection 1000. In some examples, the associated connection 1000 is between the damper link 1002 and the turbine center frame 511, the turbine rear frame 512, the fan hub frame 510, the pylon 515, and/or the nacelle 702. For example, a first longitudinal end of the damper link 1006 couples to the fan hub frame 510 and a second longitudinal end of the damper link 1007 couples to the pylon 515 or the nacelle 702 when the damper link 1002 is implemented as a forward mount attachment for the engine core 504.

FIG. 10 includes a magnified view 1004 of the first longitudinal end of the damper link 1006. In FIG. 10, the first longitudinal end of the damper link 1006 includes a clevis 1008. In FIG. 10, the clevis 1008 includes an opening with one or more slots 1010. In FIG. 10, a bearing 1012 includes a slot (e.g., an opening) 1014 that corresponds with the one or more slots 1010 of the clevis 1008. In some examples, the fan hub frame 510, the turbine rear frame 512, the pylon 515, and/or the nacelle 702 includes the bearing 1012. In some examples, the clevis 1008 is positioned around the bearing 1012 and the one or more slots 1010 of the clevis 1008 align with the slot 1014 of the bearing 1012. In FIG. 10, a pin 1016 is inserted through the one or more slots 1010 of the clevis 1008 and the slot 1014 of the bearing 1012 to couple the damper link 1002 to the fan hub frame 510, the turbine rear frame 512, the pylon 515, and/or the nacelle 702.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example damper engine mount links have been disclosed that provide a resistance to a rate of movement of the engine core based on flight conditions, a position of the engine core, a movement of the engine core, a position of the fan hub frame, a position of the damper link, and/or a length of the damper link. Further, the example damper engine mount links maintain a clearance between turbine blades of the engine core and an associated casing to increase an efficiency of the engine by, e.g., reducing variations in clearances associated with a thrust-producing flow stream. Additionally, the example damper engine mount links maintain an alignment of the turbine blades of the core to increase the efficiency of the engine.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

Further aspects of the invention are provided by the subject matter of the following clauses:

1. An engine assembly, comprising: a core including a fore portion and an aft portion, the fore portion of the core to couple to a fan hub frame, the aft portion of the core to couple to at least one of a turbine rear frame or a turbine center frame; a forward mount to couple the fan hub frame to a first aircraft mount; and a damper link to couple the turbine rear frame or the turbine center frame to a second aircraft mount.

2. The engine assembly of any preceding clause, further including an active control system to provide the damper link a stiffness based on at least one of a flight condition or a sensor input.

3. The engine assembly of any preceding clause, wherein the active control system modulates the stiffness of the damper link.

4. The engine assembly of any preceding clause, wherein the damper link is at least one of a squeeze film damper, a wire mesh damper, a shock absorber, or a controllable damper including an adjustable fluid stiffness.

5. The engine assembly of any preceding clause, wherein the controllable damper modulates the adjustable fluid stiffness based on at least one of a flight condition, a position of the fan hub frame, a position of the turbine rear frame, a position of the turbine center frame, or a position of the core.

6. The engine assembly of any preceding clause, further including a pylon in connection with a nacelle, the nacelle circumferentially surrounding the core, the forward mount and the damper link configured to couple to at least one of the pylon or the nacelle.

7. The engine assembly of any preceding clause, further including a pin inserted through an opening of longitudinal ends of the damper link and an opening of the fan hub frame, the turbine rear frame, the turbine center frame, the pylon, or the nacelle to couple the damper link to the fan hub frame, the turbine rear frame, the pylon, or the nacelle.

8. The engine assembly of any preceding clause, wherein the damper link is positioned in a radial direction, a laterally tilted direction, or an axially tilted direction relative to the core.

9. The engine assembly of any preceding clause, wherein the damper link includes a plurality of damper links circumferentially positioned around the turbine rear frame.

10. The engine assembly of any preceding clause, wherein the damper link is a first damper link, and wherein the forward mount includes a second damper link to couple the forward mount to the aircraft.

11. The engine assembly of any preceding clause, wherein the damper link maintains a clearance between turbine blades of the core and a casing surrounding the core.

12. The engine assembly of any preceding clause, wherein the damper link maintains an alignment of turbine blades of the core.

13. The engine assembly of any preceding clause, wherein the damper link controls vibrations of the core.

14. The engine assembly of any preceding clause, wherein the damper link controls a noise output of the engine assembly.

15. An apparatus comprising: a damper link including a stiffness corresponding to at least one of a position of the damper link, a length of the damper link, or a rate of change of the length of the damper link; an engine to couple to a first longitudinal end of the damper link; and a nacelle or a pylon in connection with a wing of an aircraft, the nacelle or the pylon to couple to a second longitudinal end of the damper link.

16. The apparatus of any preceding clause, wherein at least one of the first longitudinal end of the damper link, the second longitudinal end of the damper link, the engine, the nacelle, or the pylon includes a clevis.

17. The apparatus of any preceding clause, wherein at least one of the first longitudinal end of the damper link, the second longitudinal end of the damper link, the engine, the nacelle, or the pylon includes a slot that corresponds with an opening of the clevis.

18. The apparatus of any preceding clause, wherein the opening of the clevis includes one or more slots.

19. The apparatus of any preceding clause, further including pins to be inserted through the opening of the clevis and the slot to couple the damper link to the engine and to the nacelle or pylon.

20. An apparatus comprising: first means for mounting a fore portion of an engine to an aircraft; and second means for mounting an aft portion of the engine to the aircraft, the second means for mounting including a first means for damping to support the engine in response to a position of the engine or a movement of the engine.

21. The apparatus of any preceding clause, wherein the first means for mounting includes a second means for damping.

22. The apparatus of any preceding clause, wherein a stiffness of the first means for damping is modulated based on a position of the engine, the movement of the engine, or flight conditions of the aircraft.

What is claimed is:

1. An engine assembly, comprising:
a core including a fore portion and an aft portion, the fore portion of the core to couple to a fan hub frame, the aft portion of the core to couple to at least one of a turbine rear frame or a turbine center frame;
a forward mount to couple the fan hub frame to a pylon of an aircraft; and
at least one damper link including a first longitudinal end and a second longitudinal end, the first longitudinal end configured to directly couple to the turbine rear frame or the turbine center frame, the second longitudinal end configured to directly couple to the pylon.

2. The engine assembly of claim 1, further including a control system to modulate stiffness of the at least one damper link based on at least one of a flight condition or a sensor input.

3. The engine assembly of claim 2, wherein the control system modulates the stiffness of the at least one damper link based on at least one of a rate of movement of the core or a position of the core.

4. The engine assembly of claim 1, wherein the at least one damper link is at least one of a squeeze film damper, a wire mesh damper, a shock absorber, or a controllable damper including an adjustable fluid stiffness.

5. The engine assembly of claim 4, wherein the controllable damper modulates the adjustable fluid stiffness based on at least one of a flight condition, a position of the fan hub frame, a position of the turbine rear frame, a position of the turbine center frame, or a position of the core.

6. The engine assembly of claim 1, wherein the at least one damper link is a first damper link, and wherein the engine assembly further includes a second damper link configured to couple the turbine rear frame or the turbine center frame to a nacelle, the nacelle circumferentially surrounding the core.

7. The engine assembly of claim 6, further including a pin inserted through an opening of longitudinal ends of the second damper link and an opening of the fan hub frame, the turbine rear frame, the turbine center frame, the pylon, or the nacelle to couple the second damper link to the fan hub frame, the turbine rear frame, the pylon, or the nacelle.

8. The engine assembly of claim 1, wherein the at least one damper link is positioned in a radial direction, a laterally tilted direction, or an axially tilted direction relative to the core.

9. The engine assembly of claim 8, wherein the at least one damper link includes a plurality of damper links circumferentially positioned around the turbine rear frame.

10. The engine assembly of claim 1, wherein the at least one damper link is a first damper link, and wherein the forward mount includes a second damper link to couple the forward mount to the first aircraft mount.

11. The engine assembly of claim 1, wherein the at least one damper link maintains a clearance between turbine blades of the core and a casing surrounding the core.

12. The engine assembly of claim 1, wherein the at least one damper link maintains an alignment of turbine blades of the core.

13. The engine assembly of claim 1, wherein the at least one damper link controls vibrations of the core.

14. The engine assembly of claim 13, wherein the at least one damper link controls a noise output of the engine assembly.

15. An apparatus comprising:
a damper link including a fluid to provide a stiffness corresponding to at least one of a position of the damper link, a length of the damper link, or a rate of change of the length of the damper link;
an engine to couple to a first longitudinal end of the damper link; and
a nacelle or a pylon in connection with a wing of an aircraft, the nacelle or the pylon to couple to a second longitudinal end of the damper link.

16. The apparatus of claim 15, wherein at least one of the first longitudinal end of the damper link, the second longitudinal end of the damper link, the engine, the nacelle, or the pylon includes a clevis.

17. The apparatus of claim 16, wherein at least one of the first longitudinal end of the damper link, the second longitudinal end of the damper link, the engine, the nacelle, or the pylon includes a slot that corresponds with an opening of the clevis.

18. The apparatus of claim 17, wherein the opening of the clevis includes one or more slots.

19. The apparatus of claim 17, further including pins to be inserted through the opening of the clevis and the slot to couple the damper link to the engine and to the nacelle or pylon.

20. An apparatus comprising:
   first means for mounting a fore portion of an engine to an aircraft; and
   second means for mounting an aft portion of the engine to the aircraft, the second means for mounting including a means for damping to adjust support provided to the engine in response to a movement of the engine, the means for damping including means for directly coupling to the aft portion of the engine and a pylon of the aircraft.

21. The apparatus of claim 20, wherein the means for damping is a second means for damping, and wherein the first means for mounting includes a first means for damping.

22. The apparatus of claim 20, wherein a stiffness of the means for damping is modulated based on a position of the engine, the movement of the engine, or flight conditions of the aircraft.

\* \* \* \* \*